United States Patent
Towers et al.

[11] Patent Number: 5,979,613
[45] Date of Patent: Nov. 9, 1999

[54] ANCHOR ARRANGEMENT FOR RETAINING A SENSOR IN A DRUM BRAKE

[75] Inventors: Kenneth Scott Towers, Granger; Djamel Charmat, South Bend, both of Ind.; Georg Blosch, Murr, Germany

[73] Assignee: Robert Bosch Technology Corporation, Broadview, Ill.

[21] Appl. No.: 09/013,336

[22] Filed: Jan. 26, 1998

[51] Int. Cl.[6] ...................................................... B60T 8/72
[52] U.S. Cl. ........................ 188/181 T; 188/327; 303/112
[58] Field of Search ................................ 188/181 T, 325, 188/327, 326, 180; 303/112

[56] References Cited

U.S. PATENT DOCUMENTS

| | | |
|---|---|---|
| 3,689,120 | 9/1972 | Sumiyoshi et al. . |
| 3,847,253 | 11/1974 | Barnes ................................. 188/181 T |
| 4,099,792 | 7/1978 | Schmid et al. ...................... 188/181 T |
| 4,129,202 | 12/1978 | Winters et al. ..................... 188/181 T |
| 4,615,419 | 10/1986 | Gaiser ................................. 188/181 T |
| 4,685,745 | 8/1987 | Reinecke ................................. 303/112 |
| 4,995,480 | 2/1991 | Hazelden et al. ................... 188/181 T |
| 5,417,482 | 5/1995 | Kashima et al. ........................ 303/112 |
| 5,531,298 | 7/1996 | Brooks . |
| 5,913,390 | 6/1999 | Hostetler ................................. 188/326 |

FOREIGN PATENT DOCUMENTS

| | | |
|---|---|---|
| 0 388 040 | 9/1990 | European Pat. Off. . |
| 38 24 812 | 1/1990 | Germany . |

*Primary Examiner*—Robert J. Oberleitner
*Assistant Examiner*—Thomas J. Williams
*Attorney, Agent, or Firm*—Leo H. McCormick, Jr.; Warren Comstock

[57] ABSTRACT

A drum brake for use in a brake system (10) having first (14) and second (16) shoes retained on a backing plate (20). The first brake shoe (14) has a first end (22) connected to an actuator (12) and a second end (26) connected to an anchor arrangement (24) and the second brake shoe (16) has a first end (36) connected to the actuator (12) and a second end (38) connected to the anchor arrangement (24) The actuator (12) responds to an input signal during a brake application by moving the first (14) and second (16) brake shoes into engagement with a drum (18). The anchor arrangement (24) includes a load sensor (64) for measuring a torque generated between the first (14) and second (16) brake shoes and the drum (18). The anchor arrangement (24) has a bracket (44) with a base (46) having first (48) and second (50) side walls which are secured to the backing plate (20). The first side wall (48) has a first central opening (56) therein while the second side wall (50) has a second central opening (58) therein. A core member (64) of the load sensor is retained by the bracket (44) between the first (48) and second (50) side walls is connected to a controller (28). First linkage (66) extends through the first opening (56) for connecting the first brake shoe (14) to the core member (64) while a second linkage (74) extends through the second opening (58) for connecting the second brake shoe (16) to the core member (64). A first linear dimension defined by the core member (64) and first (66) and second (74) linkages is less that a second linear dimension between the first (48) and second (50) side wall such that a gap "x" is created. The first (14) and second (16) brake shoes on engagement with the drum (18) defining a leading brake shoe and a trailing brake shoe. The leading brake shoe produces a first force which moves the core member (64) within the gap "x" to bring one of the first (64) and second (74) linkages into engagement with said bracket (44) and thereafter compress the core member (64) and independently modify an output signal generated therein to define an operational torque developed during a brake application.

8 Claims, 1 Drawing Sheet

ANCHOR ARRANGEMENT FOR RETAINING A SENSOR IN A DRUM BRAKE

This invention relates to a anchor arrangement for use in a brake system wherein a force generated during a brake application between a leading brake shoe and a corresponding drum is applied to a load sensor to provide a controller with an indication of the braking force developed and to control servo action between first and second brake shoes in a drum brake.

BACKGROUND OF THE INVENTION

Electrically operated brakes have been developed and used on vehicles for a period of time. A desirable characteristic offered by such brakes reside in their simplicity and an opportunity to reduce the overall weight of a vehicle. Examples of such brakes can be found in the following U.S. Pat. Nos. 4,793,447; 4,804,073; 4,850,459; 4,928,543; 4,944,372; 5,201387 and 5,913,390.

In these brakes, an output torque from an electric motor is modified through the use of various gears to provide an input for moving brake pads into engagement with another member to effect a brake application. An individual brake module for a vehicle would include a drum brake in which first and second brake shoes are urged by an actuator as a function of torque developed by an electric motor in response to an input signal supplied by a controller by an operator to effect a brake application. A concern in the operation of such brakes is the speed at which the actuation force develops and the intensity of the resulting actuation force is produced to bring the vehicle to a stop within a desired braking distance during a brake application In vehicles having electric brakes sensors are associated with the individual wheels to supply a controller with an indication of the braking of each wheel in order to regulate the individual wheel operational signals to achieve a smooth, balanced and effective stop. Unfortunately servo action which occurs between a leading brake shoe into the trailing brake shoe and variations in brake effectiveness may erroneously influence the brake torque generated during braking. Thus, while electrically operated brake systems meet current standards of operation their use has generally been limited to use in brake systems for towed vehicles

SUMMARY OF THE INVENTION

A primary object of the present invention is to provide a brake system with an anchor arrangement having a sensor which only utilizes a torque force generated by a leading shoe during braking to provide a controller with an operational signal representative of the braking of an individual wheel brake.

According to this invention, first and second brake shoes are retained on a backing plate each of which has a first end connected to an actuator and a second end retained on an anchor arrangement The actuator responds to an input signal by moving the first and second brake shoes into engagement with a drum to effect a brake application. The anchor arrangement includes sensor means for measuring a torque generated between said first and second brake shoes and the drum during a brake application. The anchor arrangement is characterized by a bracket having a base with first and second side walls secured to the backing plate. The first side wall has a first opening therein while the second side wall has a second opening therein. A core member of the sensor is located between the first and second side walls of the bracket. A first linkage member extends through the first opening for connecting the first brake shoe to the sensor while a second linkage member extends through the second opening for connecting the second brake shoe to the sensor. A gap is present between the sensor and the first and second side walls. The first and second brake shoes on engagement with the drum defines a leading brake shoe and a trailing brake shoe to produce an operational torque. The leading brake shoe produces a first force which is communicated through one of the first and second linkages for initially moving the sensor into engagement with one of the first and second side walls of the bracket to eliminate the gap and thereafter transfer an operational force into the sensor. The operational force compresses the sensor to modify an output signal generated therein and define an operational torque developed during a brake application. This output signal for this individual brake is communicated to a computer and compared with a desired overall level of braking to synchronize braking for a vehicle and provide a smooth, balanced and effective stop.

An advantage of this brake systems resides in the exclusive use of an operational torque developed through the engagement of a leading brake shoe with a drum define an operational signal which is used to control an actuation input supplied to a brake and thereby synchronize braking of several wheel brakes of a vehicle.

A further advantage of this brake system is provided by controlling the servo action between leading and trailing brake shoes to provide a smooth, balanced and effective stop in response to a desire level of braking for a vehicle.

DETAILED DESCRIPTION

Figure 1:
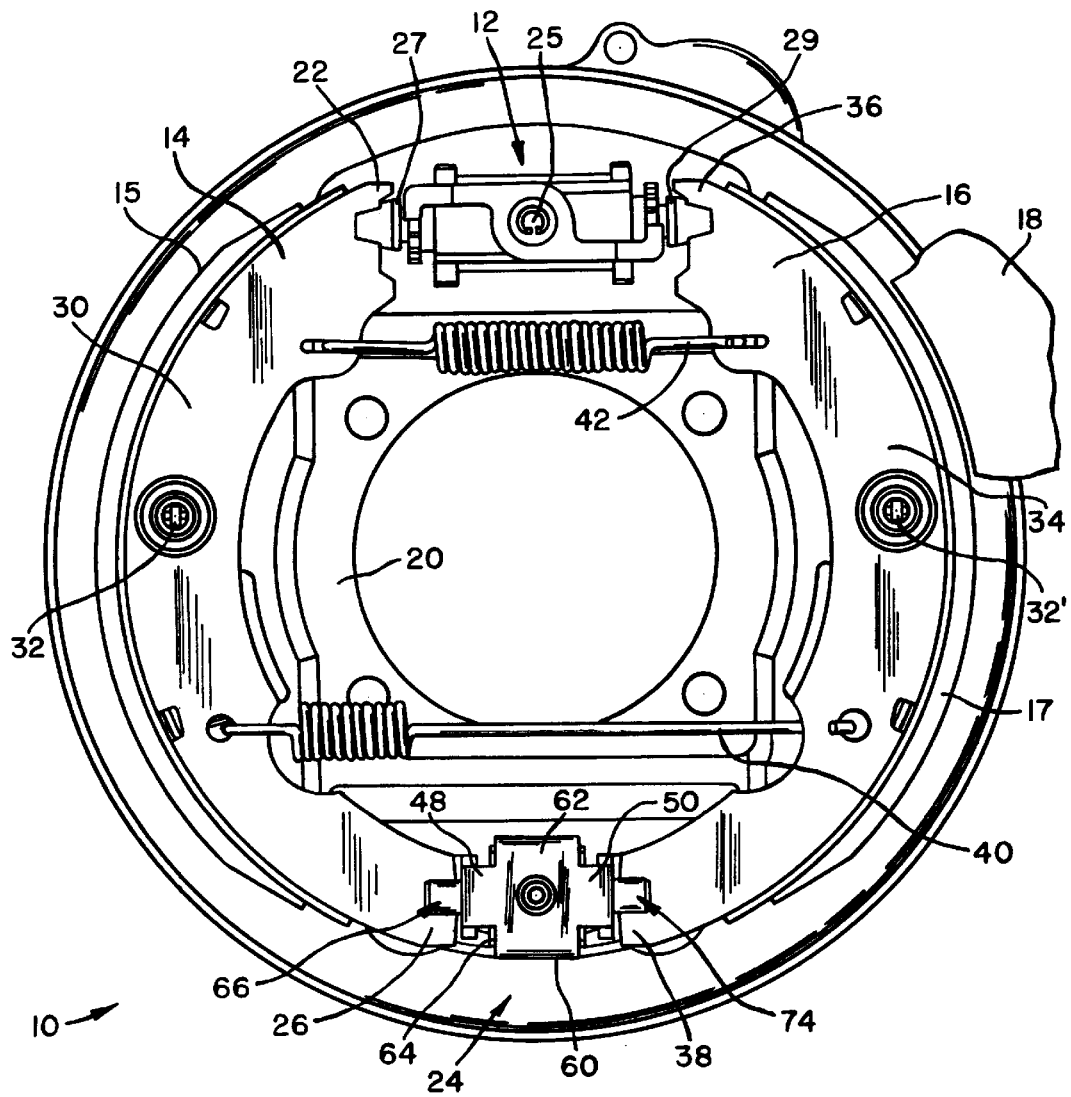
FIG. 1 is a schematic illustration of a drum brake for use in a brake system having a sennsor made according to the principals of the present invention.

The drum brake assembly 10 illustrated in FIG. 1 includes first 14 and second 16 brake shoes which are moved into engagement with a drum 18 by rack and pinion actuator 12 as fully described in U.S. Pat. No. 5,913,390 to effect a brake application.

The first brake shoe 14 has a web 30 with a first end 22 connected to the rack and pinion actuator 12 and a second end 26 located on anchor arrangement 24. The web 30 is mounted on backing plate 20 by resilient pin 32 which allows the first end 22 to pivot about the second end 26 in response to an actuation force supplied by the rack and pinion actuator 12 to move friction pad 15 on brake shoe 14 into engagement with drum 18 during a brake application.

The second brake shoe 16 has a web 34 with a first end 36 connected to the rack and pinion actuator 12 and a second end 38 located on anchor arrangement 24. The web 34 is mounted on backing plate 20 by resilient pins 32' which allows the first end 36 to pivot about the second end 38 in response to an actuation force supplied by the rack and pinion actuator 12 to move friction pad 17 on brake shoe 16 into engagement with drum 18 during a brake application.

Springs 40 and 42 act on webs 30 and 34 to urge ends 22 and 36 into engagement with the rack and pinion actuator 12 and ends 26 and 38 into engagement with the anchor arrangement 24.

When friction pads 15 and 17 engage drum 18 an operational torque is created which is transferred into the anchor arrangement 24. The anchor arrangement 24 includes a force transducer of a type disclosed in U.S. Pat. No. 5,588,466 to provide a controller 28 with an indication of the braking force being derived in response to an input signal supplied to the rack and pinion actuator 12.

Figures 2, 3:
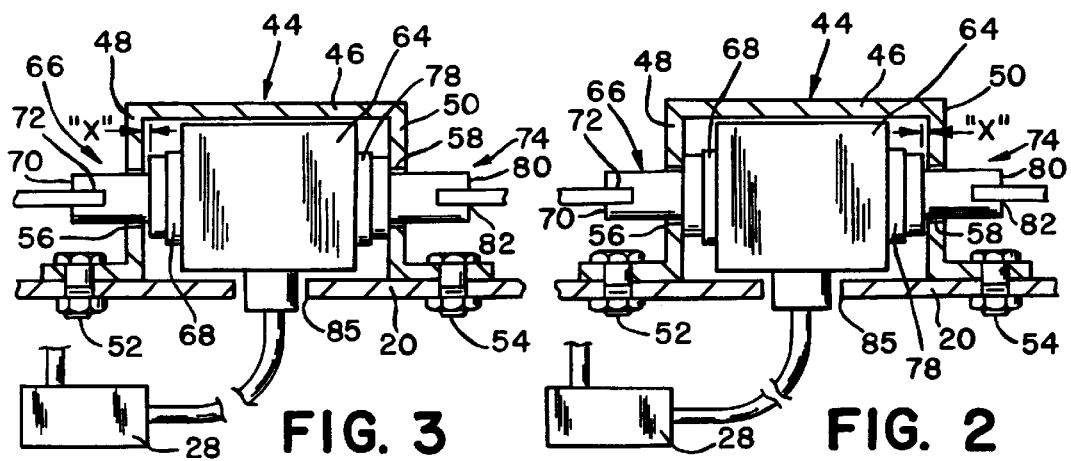
FIG. 2 a sectional view taken along line 2—2 of FIG. 1 illustrating the relationship between the core of a transducer and a bracket with torque generated by the engagement of a leading brake shoe when a wheel is rotated in a counter clockwise direction.
FIG. 3 a sectional view taken along line 2—2 of FIG. 1 illustrating the relationship between the core of a transducer and a bracket with torque generated by the engagement of a leading brake shoe when a wheel is rotated in a clockwise direction.

In more particular detail, the anchor arrangement 24 as best shown in FIGS. 2 and 3 includes by a bracket 44 having a base 46 with first 48 and second 50 side walls secured to the backing plate 20 by fasteners 52 and 54. The first 48 side wall has a first opening 56 therein while the second 50 side wall has a second opening 58 therein. First 60 and second 62 arms extend from the base 46 toward the backing plate 20. A core member 64 of the force transducer (sensor) is located between the first 48 and second 50 side walls of bracket 44. A dimensional tolerance is designed between the core member 64 and the first 48 and second 50 side walls. The linear dimensional tolerance is selected as a function of a desired travel not to exceed the running clearance between the friction pads 15 and 17 and drum 18.

A first linkage member 66 extends through the first opening 56 for connecting the first brake shoe 14 to core member 64. The first linkage member 66 has a cylindrical body with a first diameter 68 which engages core member 64, a second 67 and a third diameter 70 with a slot 72 therein for receiving the second end 26 of brake shoe 14.

A second linkage member 74 extends through the second opening 58 for connecting the second brake shoe 16 to the core member 64. The second linkage member 74 has a cylindrical body with a first diameter 78 which engages core member 64, a second diameter 80 with a slot 82 therein for receiving the second 77 and a third diameter end 38 of brake shoe 1 6

The core member 64 which is loosely located between the first 48 and second 50 side walls has a projection 84 which extends through a slot 85 in backing plate 20 assist arms 60 and 62 in maintaining core member 64 in alignment with linkage members 66 and 74. The linear dimention between the face of the second diameter 67 of the first linkage member 66 when the first diameter 68 engages core member 64 and face of the second diamter 77 of the second linkage 74 when the first diameter 68 engages core member 64 is less than the linear dimension between the first wall 48 and a second wall 50 and is equal to a gap x. Thus, core member 64 is not rigidly fixed with respect to bracket 44.

Mode of Operation of the Invention

When a brake application is desired, an operator supplies an input to a controller 28 which supplies an operational input signal to an electric motor of actuator 12. The output from the electric motor is translated by a sun gear to shaft 25. Rotation of shaft 25 is translated into linear movement of opposing first 27 and second 29 racks. Movement of the first 27 and second 29 racks of actuator 12 provide a force which pivots the first ends 22 and 36 of shoes 14 and 16 about the anchor arrangement 24 by way of the second ends 26 and 38 and bring friction linings 15 and 17 into engagement with drum 18 to effect a brake application.

On engagement of the first 15 and second 17 friction linings of the first 14 and second 16 brake shoes with drum 18 a leading brake shoe and a trailing brake shoe is created. If a vehicle is traveling in a forward direction, drum 18 will rotate in a counter clockwise direction and the first brake shoe 14 is defined as the leading brake shoe and brake shoe 16 is defined as the trailing brake shoe. The torque generated by the engagement of friction lining 15 with drum 18 introduces a first force into brake shoe 14 which is transmitted into linkage member 66 for initially moving face of the second diameter 77 of the second linkage 74 into engagement with side wall 50 and eliminate any gap x between core member 64 and side wall 50 and thereafter compress the core member 64 between the first diameter 68 of linkage 66 and end wall 50. Compression of core member 64 modifies an output signal generated therein. The modified output signal is continually communicated to a controller 28 for evaluation with operational signals supplied by other wheels of the vehicle to supply the actuator 12 with an operational signal to develop a smooth, balanced and effective stop.

In this anchor arrangement 24 only the force generated in the leading brake shoe is used to develop an operational signal which is supplied to the controller 28 in synchronizing braking for the entire vehicle. Only the force developed by the leading brake shoe is communicated into the core member 64 and as bracket 44 is fixed to the backing plate 20 and thus is not added to the rotational torque force developed in the trailing brake shoe. By restraining the core member 64 within the bracket 44 only the rotational torque force developed by the leading brake shoe 14 is effectively used to provide an indication of the braking force developed by an individual wheel brake.

FIG. 3 illustrates the operational function of the anchor apparatus 24 when the vehicle is moving in reverse and the drum 18 is rotating in a clockwise direction In this situation, brake shoe 16 becomes the leading brake shoe and brake shoe 14 becomes the trailing brake shoe. The force generated in brake shoe 16 is transmitted into face of the second diameter 67 of the first linkage 66 and initially moves the core member 64 into engagement with side wall 48 and define the gap x adjacent side wall 50. Further force applied to the core member 64 through the first diameter 78 of linkage 74 compresses the core member and correspondingly modifies an operational output which is supplied to controller 28 to assure that an input signal is supplied to rack and pinion actuator 12 to develop a smooth, balanced and effective stop.

The controller 28 on receiving an input signal from any individual wheel evaluates a desired operational force which will achieve a smooth and balance stop. In the event that any pair of wheels are operating on a surfaces which have different coefficient of friction such as experienced when two wheels are on ice and two wheels are on dry pavement, the controller 28 will supply the individual brakes associated with each set of wheel with operational signals to achieve the desired synchronized balance during a brake application.

We claim:

1. In a brake system having a first and second brake shoes retained on a backing plate, said first and second brake shoes each having a first end connected to an actuator and a second end retained on an anchor arrangement, said actuator responding to an input signal by moving said first and second brake shoes into engagement with a drum to effect a brake application, said anchor arrangement including sensor means for measuring a torque generated between said first and second brake shoes and the drum during said brake application, said anchor arrangement being characterized by a bracket having a base with first and second side walls secured to said backing plate, said first side wall having a first opening therein while said second side wall has a second opening therein, a core member of said sensor being located between said first and second side walls of said bracket, a first linkage member extending through said first opening for connecting said first brake shoe to said core, a second linkage member extending through said second opening for connecting said second brake shoe to said core, said core member, first and second linkage members having a first linear dimension which is less than a second linear dimension between said first and second walls which allows said core member to move within said bracket, said first and second brake shoes on engagement with said drum defining a leading brake shoe and a trailing brake shoe, said leading brake shoe producing a first force which is communicated through one of said first and second linkages for moving the other of said first and second linkages into engagement with an opposing one of said first and second walls and thereafter compress said core member to create an output signal exclusively from said first force to control an operational torque developed during a brake application.

2. In the brake system as recited in claim 1 wherein a difference between said first linear dimension and second linear dimension creates a gap which allows said core to move within said bracket in response to said first force, said core moves toward said first wall when said operational torque is a clockwise force and toward said second wall when said torque is a counter clockwise force.

3. In the brake system as recited in claim 1 further including said output signal is evaluated by a controller to synchronize said input signal with a desired level of synchronized braking of individual wheels for a vehicle.

4. In the brake system as recited in claim 2 further wherein said gap is substantially equal to a running clearance between said first and second brake shoes and said drum.

5. In the brake system as recited in claim 1 further wherein said output signal is evaluated by a controller to synchronize said input signal with a desired level of braking for a vehicle.

6. In the brake system as recited in claim 5 further including a projection extending from said core member and located in a slot in said backing plate for aligning said core within said bracket.

7. In a brake system having a first and second brake shoes retained on a backing plate, said first and second brake shoes each having a first end connected to an actuator and a second end retained an anchor arrangement, said actuator arrangement responding to an input signal to effect a brake application by moving said first and second brake shoes into engagement with a drum, said anchor arrangement including a sensor for measuring a torque generated between said first and second brake shoes and said drum, said anchor arrangement being characterized by a bracket having a base with first and second side walls secured to said backing plate, said first side wall having a first opening therein while said second side wall has a second opening therein, a core member of said sensor retained by said bracket between said first and second side walls and connected to a controller, first linkage extending through said first opening for connecting said first brake shoe to said core member, and second linkage extending through said second opening for connecting said second brake shoe to said core member, said core member, first linkage and second linkage having a first linear dimension and said first wall and second wall having a second linear dimension, said first linear dimension being less than said second linear dimension to define a gap, said first and second brake shoes on engagement with said drum defining a leading brake shoe and a trailing brake shoe, said leading brake shoe producing a first force which acts through said first linkage to initially move said second linkage into engagement with one of said first and second wall and thereafter compress said core member to independently modify an output signal generated therein and define an operational torque developed by said leading brake shoe during a brake application.

8. The brake system as recited in claim 7 wherein said gap is substantially equal to a running clearance between said first and second shoes and said brake drum.

\* \* \* \* \*